United States Patent
Boerger

(10) Patent No.: US 12,392,893 B2
(45) Date of Patent: Aug. 19, 2025

(54) METHOD AND RADAR SENSOR FOR MONITORING THE TRAFFIC FLOW

(71) Applicant: Robert Bosch GmbH, Stuttgart (DE)

(72) Inventor: Joachim Boerger, Friedrichshafen (DE)

(73) Assignee: ROBERT BOSCH GMBH, Stuttgart (DE)

(*) Notice: Subject to any disclaimer, the term of this patent is extended or adjusted under 35 U.S.C. 154(b) by 516 days.

(21) Appl. No.: 17/659,544

(22) Filed: Apr. 18, 2022

(65) Prior Publication Data

US 2022/0342067 A1 Oct. 27, 2022

(30) Foreign Application Priority Data

Apr. 26, 2021 (DE) .................... 10 2021 204 122.1

(51) Int. Cl.
*G01S 13/92* (2006.01)
*G01S 13/58* (2006.01)

(52) U.S. Cl.
CPC ............ *G01S 13/92* (2013.01); *G01S 13/583* (2013.01)

(58) Field of Classification Search
CPC ...... G01S 13/92; G01S 13/583; G01S 13/584; G01S 13/91; G01S 13/343; G01S 13/32; G01S 13/34; G01S 13/06; G01S 7/295; G01S 7/354; G01S 13/4445; G01S 13/4454; G01S 13/589; G01S 13/931; G01S 7/356; G01S 2013/93271; G01S 2013/466; G01S 13/878; G01S 2013/0245;

(Continued)

(56) References Cited

U.S. PATENT DOCUMENTS 6,914,541 B1 * 7/2005 Zierden .................. G08G 1/052
340/936
7,626,536 B1 * 12/2009 Rihaczek ................ G01S 13/46
342/107

(Continued)

OTHER PUBLICATIONS

European Commission Implementing Decision (EU) 2019/1345. "amending Decision 2006/771/EC updating harmonised technical conditions in the area of radio spectrum use for short-range devices.", 2019, [http://data.europa.eu/eli/dec_impl/2019/1345/oj]. (Year : 2019).*

(Continued)

*Primary Examiner* — Vladimir Magloire
*Assistant Examiner* — Remash R Guyah
(74) *Attorney, Agent, or Firm* — NORTON ROSE FULBRIGHT US LLP

(57) ABSTRACT

A method for monitoring the traffic flow with the aid of a stationary radar sensor, which operates in the frequency band of 76 GHz to 77 GHz and is operated in such a way that it meets a radiation protection criterion according to which, in a sequence of consecutive time intervals which all have the same length T, each of these time intervals includes an uninterrupted radiation-free time period of at least 0.9 T. An arbitrary stationary point in the surroundings of the radar sensor within each of these time intervals is exposed to the radar radiation of this radar sensor for no more than a radiation duration of $L \leq T/100$. The radar sensor is static during the measuring operation, and the radiation protection criterion is met by the temporally clocked operation of the radar sensor.

7 Claims, 3 Drawing Sheets

(58) Field of Classification Search
CPC ..... G01S 2013/9309; G01S 2013/9375; G01S
2013/9386; G01S 2205/002; G01S
2205/007; G08G 1/0145; G08G 1/0104;
G08G 1/0133; G08G 1/0116; G08G
1/052; B61L 23/041; B61L 29/30
USPC .................. 342/179, 200, 385; 701/118, 117
See application file for complete search history.

(56) References Cited

U.S. PATENT DOCUMENTS

| | | | |
|---|---|---|---|
| 8,264,401 B1* | 9/2012 | Kavaler | G01S 13/14 |
| | | | 342/136 |
| 10,012,726 B2* | 7/2018 | Schoor | G01S 7/35 |
| 2015/0002332 A1* | 1/2015 | Bi | G01S 13/02 |
| | | | 342/385 |
| 2015/0325119 A1* | 11/2015 | Lehnertz | G08G 1/0133 |
| | | | 701/117 |
| 2020/0132808 A1* | 4/2020 | Jungmaier | G01S 7/03 |

OTHER PUBLICATIONS

Texas Instruments. "TI mmWave Radar Device Regulatory Compliance Guide." Texas Instruments, 2019, [https://www.ti.com/lit/pdf/spracp3]. (Year: 2019).*
H. Rohling and E. Lissel, "77 GHz radar sensor for car application," Proceedings International Radar Conference, Alexandria, VA, USA, 1995, pp. 373-379, doi: 10.1109/RADAR.1995.522575. (Year: 1995).*

* cited by examiner

METHOD AND RADAR SENSOR FOR MONITORING THE TRAFFIC FLOW

CROSS REFERENCE

The present application claims the benefit under 35 U.S.C. § 119 of German Patent Application No. DE 10 2021 204 122.1 filed on Apr. 26, 2021, which is expressly incorporated herein by reference in its entirety.

FIELD

The present invention relates to a method for monitoring the traffic flow with the aid of a stationary radar sensor which operates in the frequency band of 76 GHz to 77 GHz and is operated in such a way that it meets a radiation protection criterion according to which, in a sequence of consecutive time intervals which all have the same length T, each of these time intervals includes an uninterrupted radiation-free time period of at least 0.9 T, and an arbitrary stationary point in the surroundings of the radar sensor within each of these time intervals is exposed to the radar radiation of this radar sensor for no more than a radiation duration of $L<=T/100$.

Another object of the present invention is a radar sensor for carrying out this method.

BACKGROUND INFORMATION

Radar sensors which operate in the frequency band of 76 GHz to 77 GHz have been used for quite some time in motor vehicles for monitoring the traffic surroundings within the scope of driver assistance systems and/or collision warning systems.

An intelligent traffic management system makes it necessary for the traffic infrastructure to also be equipped with sensors, which enable a permanent automatic monitoring of the traffic flow. In principle, stationary radar sensors, which are installed in the infrastructure, may also be used for this monitoring task. However, the risk then exists that the radiation emitted by the stationary sensors interferes with the radiation emitted by the radar sensors of the motor vehicles, and thus the function of the radar sensors on board the vehicles is impaired.

In some countries, the frequency band from 76 GHz to 77 GHz is thus blocked for stationary radar sensors. Radar sensors are under development which operate in a lower frequency band, for example in the vicinity of 60 GHz. Due to the larger wavelength of the radar radiation, however, new antenna configurations including, in general, larger dimensions must be developed for this purpose, and extensive adaptations are also necessary on the remaining components of the radar sensor, resulting overall in a high development complexity.

In some countries, in the European Union among others, the use of scanning radar sensors is allowed in the frequency band of 76 GHz to 77 GHz with certain restrictions. Behind this is the consideration that a scanning radar sensor would in each case interfere only briefly with a radar sensor of a motor vehicle, namely only when the radar lobe passes over the location of the motor vehicle. On the one hand, the restrictions limit the maximum permissible intensity of the radar radiation of the scanning radar sensors and, on the other hand, the duration for which an individual radar sensor of a motor vehicle is exposed to this radiation is to be limited to such an extent that no safety-relevant function impairments occur. For this reason, the scanning radar sensors are required to meet the radiation protection criterion mentioned at the outset. In the European Union, for example, the maximum radiation duration L per time interval having length T=250 ms must not exceed 1.25 ms (=T/200). The radiation duration also must not be uniformly distributed over the time interval of 250 ms, but must be so concentrated that, within the time interval of 250 ms, the radar sensor of a motor vehicle does not receive any radiation whatsoever from the scanning radar sensor during an uninterrupted time period of 240 ms. This is to ensure that the motor vehicle radar sensors are able to operate without impairment for at least the majority of the time.

In the case of scanning radar sensors, for example in the case of radar sensors rotating at a constant rotational speed, the radiation protection criterion may be met by suitably matching the rotational speed and the angular extension of the radar lobe.

SUMMARY

It is an object of the present invention to provide a method for monitoring the traffic flow, which may be carried out using more cost-effective and nonetheless functionally reliable infrastructure equipment.

According to the present invention, this object may be achieved in that the radar sensor is static during the measuring operation, and the radiation protection criterion is met by a temporally clocked operation of the radar sensor.

In the method according to an example embodiment of the present invention, the radar sensors used in the infrastructure are thus not only stationary, but also completely static during the measuring operation, i.e., do not scan, so that no expensive mechanical drives prone to wear and malfunction are required. The limitation of the radiation duration is achieved by a clocked operation of the radar sensor, during which the radar radiation during each interval having length T is only emitted during activity phases which, at a maximum, have a length L and which are separated from one another by idle phases having the minimum length 0.9 T.

This has the advantage that the technically mature and proven radar sensors used today in motor vehicles may be adopted essentially unchanged for the use in the infrastructure, and only an adaptation in the control software is required to ensure sufficiently small working phases and sufficiently long idle phases.

Advantageous embodiments of the present invention are disclosed herein.

A radar sensor which is suitable for carrying out the method according to the present invention is also provided.

The radar sensor may be an FMCW radar, as is customary in motor vehicles. In the case of such an FMCW radar, the frequency of the sent signal is modulated in a ramp-shaped manner. Since the electronic evaluation of the received radar signals is computationally intensive and, in general, necessitates more time than is required for collecting the data, in a conventional FMCW radar there is already a periodic alternation between activity phases, during which sending and receiving take place, and idle phases, during which only a signal evaluation takes place. However, the duty cycle here is more in the order of magnitude of 0.5, i.e., the overall activity duration of each measuring cycle is considerably greater than T/100.

In one specific embodiment of the present invention, the radar sensor is a so-called rapid chirp FMCW radar. In this radar principle, the frequency modulation ramps (chirps) are so short and so steep that the frequency of one intermediate frequency signal, which arises by mixing the sent signal with the received signal, is almost exclusively determined by the distance of the radar target, and the phase shift of the receive signal, caused by the relative movement of the object, over the duration of an individual frequency ramp is negligible. These short and steep ramps thus enable a precise distance measurement even during a very short radiation duration.

The relative velocity is ascertained in this radar principle, for example, with the aid of a two-dimensional Fourier transform, during which one dimension corresponds to the temporal profile of the signal during a single ramp, while the second dimension corresponds to the temporal sequence of the consecutively sent ramps. The Fourier spectrum in this second dimension supplies the relative velocities of the objects. Here, however, the consequence of the very short radiation duration L is that the velocities may only be measured using limited resolution.

For monitoring tasks during which the relative velocity is not relevant, for example for traffic counts or during the detection of stationary obstacles, the limited resolution of the velocities may be tolerated. In other applications, in which the relative velocity should also be detected, the lower resolution may be compensated for by carrying out the calculation and tracking, e.g., with the aid of arithmetic averaging or with the aid of a Kalman filter, over multiple measuring time intervals of length T, and thus smoothing the fluctuations of the velocity values. Even though the results of the velocity measurements are then not as up-to-date as with a radar sensor of a motor vehicle, the high up-to-dateness is generally also not necessary since, in contrast to driver assistance systems, no decisions which must be made on short notice arise when monitoring the traffic flow.

One exemplary embodiment is described in greater detail hereafter based on the figures.

DETAILED DESCRIPTION OF EXAMPLE EMBODIMENTS

Figure 1:
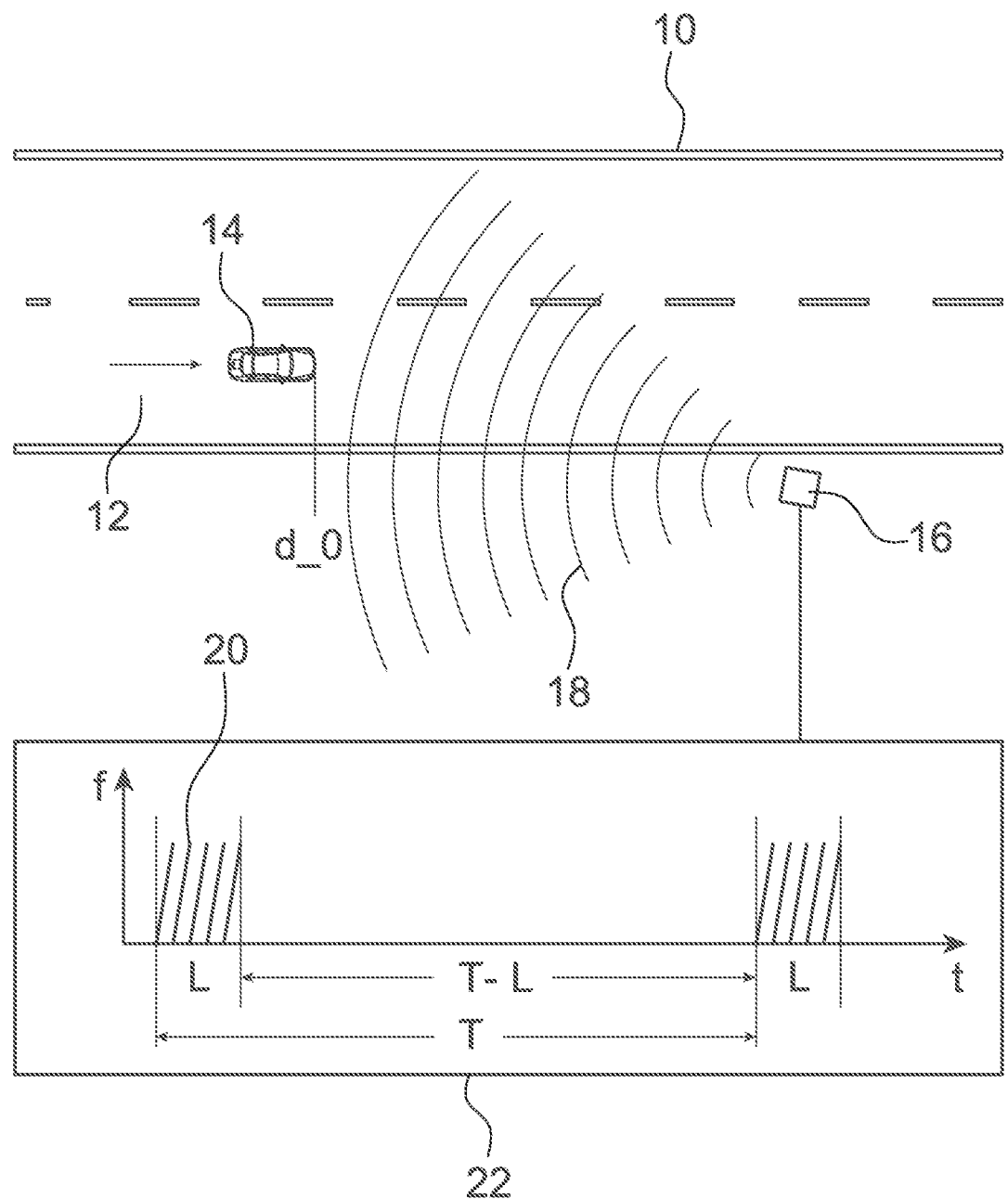
FIG. 1 shows a diagram of a radar sensor for monitoring the traffic flow in a traffic infrastructure, including a time diagram for illustrating a clocked operation of the radar sensor.

FIG. 1 shows a section of a road 10. A motor vehicle 14 is driving on a roadway 12 of this road. A radar sensor 16 is mounted on a pole at the roadside in a stationary and static manner, whose radar lobe 18 is directed at a reference point of roadway 12 situated at a distance d_0 ahead of the position of radar sensor 16. During a time period in which motor vehicle 14 approaches this reference point in the direction of the arrow, passes this point, and then further approaches radar sensor 16, motor vehicle is located by radar sensor 16, and the distance of the motor vehicle is measured periodically, using a period duration T of 250 ms, for example. In this way, it is possible to determine the point in time at which the motor vehicle passes the reference point. Since vehicles following one another pass this point at different times, it is possible in this way to reliably determine the number of vehicles which negotiate roadway 12 within a time period of, for example, one hour or one day, even in the case of high traffic density.

In the shown example, radar sensor 16 is a rapid chirp FMCW radar which, during each time interval of length T within an activity phase of length L, sends a radar signal whose frequency is modulated in the form of a sequence of short and steep frequency ramps 20. In FIG. 1, frequency f of the sent signal is plotted in a window 22 as a function of time t. As is customary with a rapid chirp FMCW radar, the time signal recorded by the radar sensor during the activity phase is subjected to a two-dimensional Fourier transform (2D FFT). One dimension is used to determine the distance of the radar target, i.e., e.g., of motor vehicle 14, based on the signal profile on each individual frequency ramp 20. The other dimension is used to determine the relative velocity of the located vehicle based on the change in the signal from ramp to ramp.

In contrast to customary radar sensors of this type, length L of the activity phases here, however, is very small in relation to length T of the entire measuring cycle, so that the majority of the measuring cycle is made up of an idle phase of length T−L, during which no radar signal is sent. For example, the activity phase has length L=1.25 ms, i.e., only 1/200 of length T of the entire measuring cycle. In this way, it is ensured that, during each time interval of length T (250 ms), radiation duration L, during which an on-board radar sensor of motor vehicle 14 is exposed to this radiation, is no more than 1.25 ms. In this way, the extent of interferences between the radiation of radar sensor 16 and the radiation of the on-board radar sensor of motor vehicle 14 is limited to a tolerable degree. During the entire idle phase having length T−L, the radar sensor of motor vehicle 14 may operate completely without impairment so that the traffic situation may be reliably tracked in real time, and a driver assistance system or collision warning system of motor vehicle 14 receives reliable pieces of information and is able to make the necessary decisions quickly and on a reliable basis.

Figure 2A:
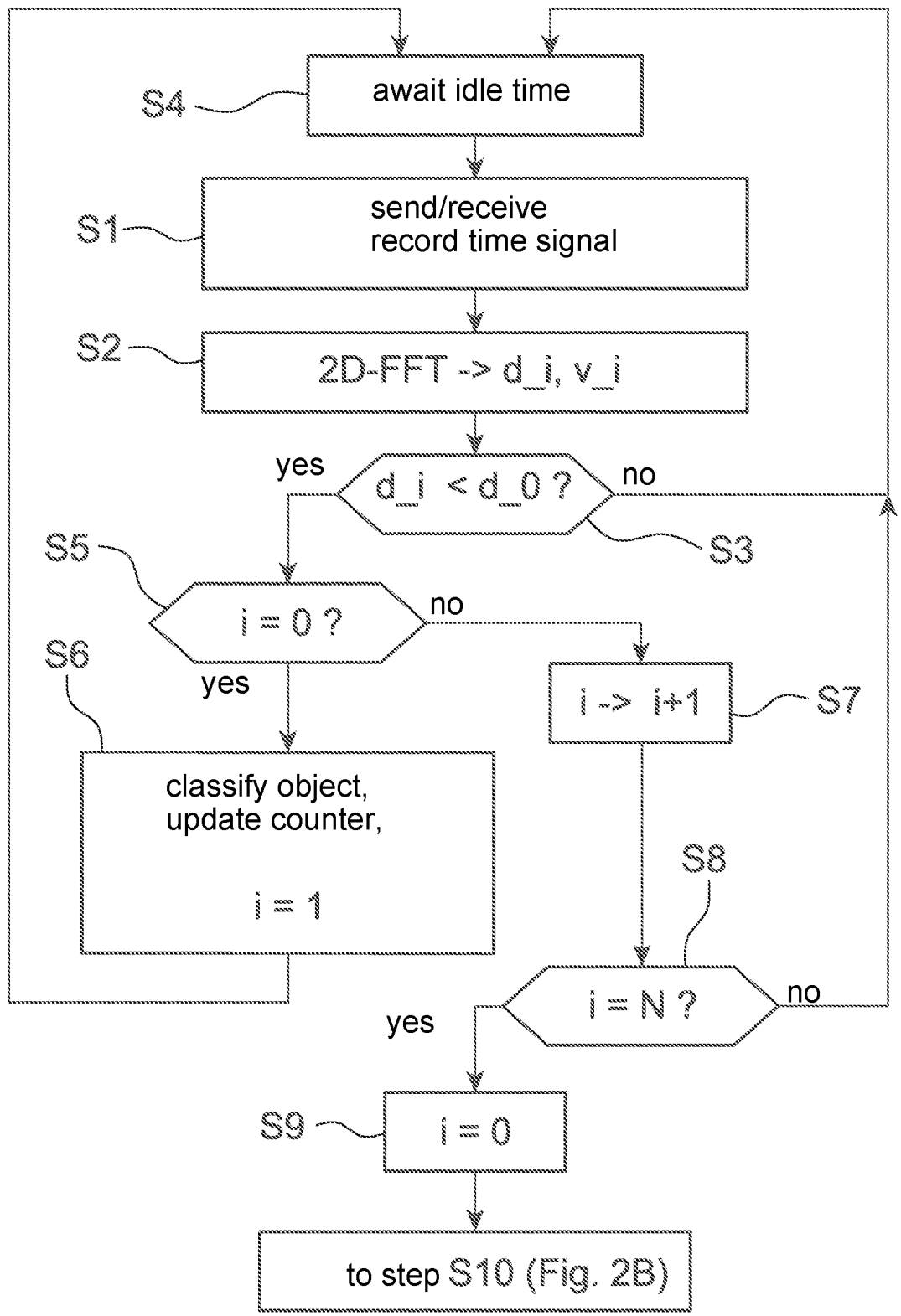
FIGS. 2A through 2B show a flowchart for illustrating one example embodiment of a method according to the present invention.
Figure 2B:
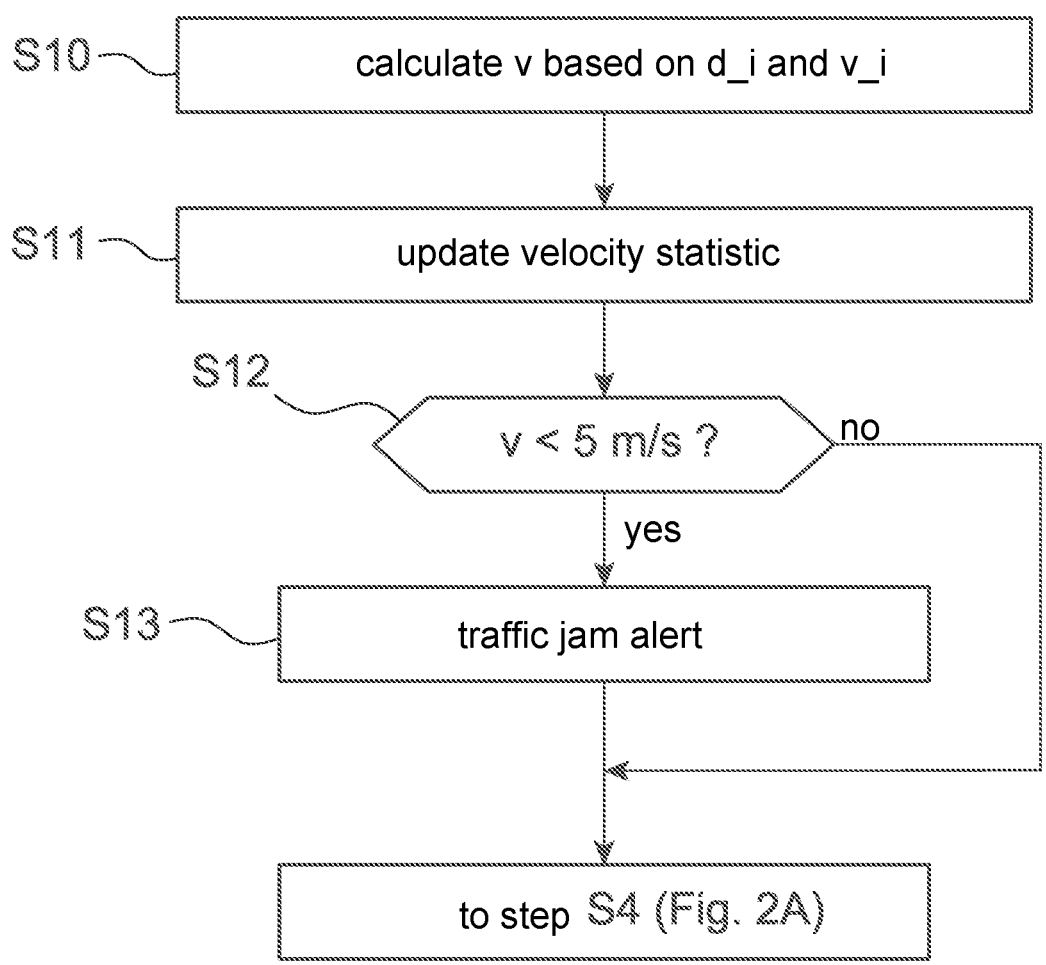

FIG. 2 shows one example of a method, in the form of a flowchart, with the aid of which, using radar sensor 16, a traffic count may be carried out, a velocity statistic of the vehicles driving on roadway 12 may be created and, in the case of a traffic jam, a traffic jam alert may be generated.

In step S1, a radar signal is sent during an activity phase of length L, whose frequency f is in the frequency band of 76 GHz to 77 GHz. The frequency is modulated in the form of a sequence of frequency ramps 20. The radar echoes received by the radar targets are received, digitized, and recorded as a time signal over the duration of the activity phase. The signals recorded on the various frequency ramps form a two-dimensional data field in which one dimension indicates the time within the respective frequency ramp, and the second dimension identifies the frequency ramp.

In step S2, a two-dimensional spectrum is then formed by a two-dimensional Fourier transform (2D FFT), in which each located object, for example motor vehicle 14, becomes apparent as a peak. The position of this peak in the first dimension indicates measured distance d_i of this object, and the position of the peak in the second dimension indicates (with lesser accuracy) velocity v_i of this object. Values d_i and v_i are stored.

In step S3, it is checked whether measured distance d_i is smaller than distance d_0. If this is not the case, i.e., when vehicle 14 has not yet passed the reference point, a jump is made to step S4 and, after idle time T−L has elapsed, a jump is made back to step S1, and a new measuring cycle begins.

If, in step S3, the result is "yes," it is checked in step S5 whether a counting index i has the value 0. If this is the case, the located object is classified in step S6 to determine the vehicle type in greater detail. For example, a distinction may be made between trucks, passenger cars, and two-wheelers using an angle-resolving radar sensor based on the measured object dimensions. The different vehicle types are counted separately in step S6. If the object was classified as a passenger car, the counter content for passenger cars is increased by 1, and a corresponding procedure is carried out for the other vehicle types. In addition, counting index i is initialized to the value 1 in step S6. Thereafter, a jump takes place back to step S4.

If it was established in step S5 that counting index i is already different from 0, this index is increased by 1 in step S7, and it is checked in step S8 whether the index has already reached a certain value N. If this is not the case, a jump takes place back to step S4. Otherwise, counting index i is reset to 0 in step S9, and a jump takes place to step S10 in FIG. 2B.

The routine described up to here ensures that a located object, such as, for example, vehicle 14, is tracked over N measuring cycles starting at the point in time at which it has passed the reference point, an updated value $d\_i$ for the distance and an updated value $v\_i$ for the velocity being stored during each measuring cycle.

In step S10, a more precise value for velocity v of the located object is calculated based on these stored values. The calculation may take place, for example, by averaging over stored values $v\_i$ or by calculating difference $d\_0 - \_(N-1)$ and division by $N*T$ (the overall duration of N measuring cycles). Optionally, it is also possible to carry out both calculation methods in parallel, and to then form a weighted sum from the results.

In step S11, a velocity statistic is updated based on velocity v calculated in step S10, which indicates the velocity distribution of the located vehicles.

In step S12, it is checked whether the measured velocity v is smaller than a certain threshold value, for example 5 m/s. If this is the case, this means that the traffic is backing up on roadway 12, and the most recently located vehicle is stationary or only driving at walking speed. In this case, a traffic jam alert is sent in step S13. Thereafter, a jump takes place back to step S4 in FIG. 2A. If the result in step S12 is negative, step S13 is skipped.

In the next measuring cycle, counting index i has the value 0, and it is waited until the next vehicle has reached the reference point at $d\_0$. If the number N of the measuring cycles per vehicle is 3 or 4, for example, the overall measuring duration per vehicle is smaller than the smallest temporal distance to be expected between consecutive vehicles. Optionally, however, the method may also be expanded and modified in such a way that multiple vehicles located shortly after one another may be tracked in parallel. In this case, a longer overall measuring duration per vehicle is possible, so that more precise velocity values are obtained.

What is claimed is:

1. A method for monitoring the traffic using a stationary radar sensor, the method comprising:
performing measuring operations using the radar sensor by operating the radar sensor in a frequency band of 76 GHz to 77 GHz so that it meets a radiation protection criterion according to which, in a sequence of consecutive time intervals which all have the same length T, each of the time intervals includes an uninterrupted radiation-free time period of at least 0.9 T, and an arbitrary stationary point in surroundings of the radar sensor within each of these time intervals is exposed to radar radiation of the radar sensor for no more than a radiation duration of $L \leq T/100$, wherein the operating of the radar sensor includes temporally clocking operation of the radar sensor to meet the radiation protection criterion;
wherein the radar sensor is situated in a stationary traffic infrastructure, and is completely static during the measuring operations so that the radar sensor does not scan and does not rotate during the measuring operations, and
wherein a located object is tracked over N measuring cycles starting at a point in time at which the located object has passed a reference point, an updated value $d\_i$ for a distance and an updated value $v\_i$ for a velocity are stored during each of the measuring cycles;
wherein the radar sensor is a rapid chirp FMCW radar sensor.

2. The method as recited in claim 1, wherein the radiation duration L is $\leq T/200$.

3. The method as recited in claim 1, wherein the radiation-free time period is at least 0.95 T.

4. The method as recited in claim 1, wherein the radiation-free period is at least 0.995 T.

5. The method as recited in claim 1, wherein the length T of the time intervals is 250 ms.

6. The method as recited in claim 1, wherein, for each of the time intervals, one value $v\_i$ is measured for a velocity v of each located radar target during one of the time intervals, and a final value for the velocity v is calculated based on the values $v\_i$ obtained in a specific number of measuring cycles, and wherein the final value is calculated by averaging stored values $v\_i$ and/or by calculating a difference $d\_0 - d\_(N-1)$ and division by $N*T$, which is an overall duration of N measuring cycles and T is the time interval.

7. A radar sensor apparatus, comprising:
a radar sensor configured to perform measuring operations by operating in a frequency band of 76 GHz to 77 GHz so that it meets a radiation protection criterion according to which, in a sequence of consecutive measuring cycles of the radar sensor which all have the same length T, each measuring cycle including an activity phase having a length L, during which radar radiation is sent and received, and an idle phase having a length T−L, during which no radar radiation is sent, wherein the length L of the activity phase is no more than T/100, wherein the radar sensor apparatus is configured to temporally clock the operating of the radar sensor to meet the radiation protection criterion;
wherein the radar sensor is situated in a stationary traffic infrastructure, and is completely static during the measuring operations so that the radar sensor does not scan and does not rotate during the measuring operations;
wherein a located object is tracked over N measuring cycles starting at a point in time at which the located object has passed a reference point, an updated value $d\_i$ for a distance and an updated value $v\_i$ for a velocity are stored during each of the measuring cycles;
wherein the radar sensor is a rapid chirp FMCW radar sensor.

* * * * *